(12) United States Patent
Wang et al.

(10) Patent No.: US 7,383,360 B2
(45) Date of Patent: Jun. 3, 2008

(54) ELECTRONIC DATA STORAGE SYSTEM DIVIDES COMMAND REQUIRING DATA TRANSFER INTO SUBCOMMANDS, IN ACCORDANCE WITH PERFORMANCE OF DEVICES

(75) Inventors: Liang-Yun Wang, Taipei (TW); Chin-Sung Lee, Hsinchu (TW)

(73) Assignee: Mediatek, Inc., Hsin-Chu (TW)

( * ) Notice: Subject to any disclaimer, the term of this patent is extended or adjusted under 35 U.S.C. 154(b) by 427 days.

(21) Appl. No.: 10/989,748

(22) Filed: Nov. 16, 2004

(65) Prior Publication Data
US 2006/0106950 A1     May 18, 2006

(51) Int. Cl.
G06F 3/00 (2006.01)
G06F 13/12 (2006.01)
G06F 13/38 (2006.01)

(52) U.S. Cl. ............................. 710/5; 710/40; 710/41; 710/74

(58) Field of Classification Search ...................... 710/5
See application file for complete search history.

(56) References Cited

U.S. PATENT DOCUMENTS

| | | | | |
|---|---|---|---|---|
| 5,968,115 A | * | 10/1999 | Trout | ........................ 718/107 |
| 6,304,925 B1 | * | 10/2001 | Liu et al. | ........................ 710/62 |
| 7,062,584 B1 | * | 6/2006 | Worrell et al. | ............... 710/301 |
| 2002/0073258 A1 | * | 6/2002 | Riley et al. | .................. 710/105 |
| 2002/0138686 A1 | | 9/2002 | Yang et al. | |
| 2003/0041203 A1 | * | 2/2003 | Jones et al. | ................... 710/301 |
| 2003/0118116 A1 | | 6/2003 | Aggarwal et al. | |
| 2006/0101179 A1 | * | 5/2006 | Lee et al. | .................... 710/113 |

FOREIGN PATENT DOCUMENTS

| KR | 20030048571 | 6/2003 |
|---|---|---|
| TW | I225598 | 12/2004 |

\* cited by examiner

*Primary Examiner*—Alford W. Kindred
*Assistant Examiner*—Brooke J Dews
(74) *Attorney, Agent, or Firm*—Thomas, Kayden, Horstemeyer & Risley

(57) ABSTRACT

An electronic system includes two or more peripheral devices or units each of which is electronically coupled to the host through a single port of a predetermined bus. By splitting commands from the host to at least one of the two or more peripheral units into subcommands or by repeating commands, the data bus will be released for another command to another device or unit, the overall system efficiency is thus improved.

16 Claims, 4 Drawing Sheets

| Byte\Bit | 7 | 6 | 5 | 4 | 3 | 2 | 1 | 0 |
|---|---|---|---|---|---|---|---|---|
| 0 | Operation code (28h) ||||||||
| 1 | LUN (Obsolete) ||| DPO (0) | FUA | Reserved || Rel Adr |
| 2 | (MSB) |||||||| 
| 3 | Logical Block Address ||||||||
| 4 | ||||||||
| 5 | (LSB) ||||||||
| 6 | Specific function type ||||||||
| 7 | (MSB) ||||||||
| 8 | Transfer Length |||||||(LSB)|
| 9 | Vendor - Specific ||| Reserved || NACA | Flag | Link |
| 10 | PAD ||||||||
| 11 | ||||||||

401

ELECTRONIC DATA STORAGE SYSTEM DIVIDES COMMAND REQUIRING DATA TRANSFER INTO SUBCOMMANDS, IN ACCORDANCE WITH PERFORMANCE OF DEVICES

CROSS-REFERENCE TO RELATED APPLICATION

This application is related to previously filed application entitled "Combined Optical Storage and Flash Card Reader Using Single IDE or SATA Port and Method Thereof," filed on Mar. 5, 2004, with Ser. No. 10/708,464, and the entire disclosure of which is herein incorporated by reference.

BACKGROUND

1. Field of the Invention

The invention relates to an electronic system, and more particularly, to an information storage and retrieval system having a plurality of storage units using a single port on a data bus system, such as the Integrated Drive Electronics (IDE) bus or a Serial AT Attachment (SATA) interface.

2. Description of Related Art

Electronic information storage devices are becoming increasingly important in today's business environment. Optical storage media, flash card devices, and other information storage options are important technologies which can be integrated into a PC or other similar system. In order to combine the functions and advantages of various storage technologies, interconnect buses such as the Integrated Drive Electronics (IDE) bus, also known as the AT Attachment (ATA) bus or the Parallel AT Attachment (PATA) bus, as well as the Serial AT Attachment (SATA) interface are now in wide use. These represent one set of important data transfer protocol. Furthermore, the AT Attachment Packet Interface (ATAPI) for optical storage devices is an important extension of the ATA Interface which supports connections of such devices to personal computers. The ATAPI Standard defines a Task File, a set of registers used by the peripheral devices and personal computer, to transfer data. According to ATAPI, commands are communicated using packets. To allow for generic packet transfer to the peripherals devices, there is a minimum set of information that is exchanged, generically supporting the following:

Command Packet

Command Parameter Data (e.g., Write Data)

Command Response Data (e.g., Read Data)

Status, presented using the ATAPI Status Register.

The ATAPI commands were derived from the SCSI command set. With the exception of the CD-ROM MSF addressing technique, the interface uses logical rather than physical addressing for all data blocks. A logical unit may coincide with all or part of a peripheral device. Therefore, in this specification we will from time to time make a distinction between a physical device, a logical unit, or a functional unit which comprises an integrated packaged unit including one or more physical devices. However, the principles of this invention will apply beyond the categorical distinctions made here.

As a result of the increasing demands for more data storage capabilities, data storage systems have been developed that contain one, or typically several, peripheral devices. Such data storage systems may be connected to a host to increase the data storage capacity that is available to the host, such as a personal computer. While such multi-unit data storage systems solve the capacity problem, they create a secondary problem in decreased system performance; this is because system performance can be hampered by the data bus, which usually gets stalled if multiple units are sharing the same port on an interface, such as the IDE/ATA or SATA channel port, wherein the performance of all the units are limited by the speed of the worst-performing units.

ATAPI command protocol basically follows the first-come, first-serve rule. The IDE bus protocol specifies the concept of channels and ports. Each channel in an IDE bus includes a first port and a second port and is normally associated with a single physical cable. IDE/SATA architecture includes, as one possibility, one or more peripheral storage device electrically connected to a host using an IDE or SATA channel. The host can be a personal computer system, a central processing unit (CPU) of an embedded system, or another device that needs to access a peripheral device. When a processor wishes to cause a data transfer targeting a peripheral device, the host first issues a "packet" command to the storage device. The packet command is a command that complies with the ATA protocol and informs the storage device that the processor wishes to deliver a block of data to the optical storage device that includes command programming information for a data transfer. A "command packet" comprises the structure used to communicate commands from a host computer to an ATAPI or other peripheral device.

When multiple devices and/or units share the same IDE or SATA port or other types of port, the host can fetch or store data concurrently from or to the multiple targeted units according to, for example, principles of the invention filed in a previous patent application filed on Mar. 5, 2004 with Ser. No. 10/708,464 assigned to the same party as the present invention. Each of the multiple peripheral devices is connected to and shares a single port of the IDE/SATA channel, allowing the host to access each of the logical units through the single port.

In this situation, a simple first-come, first-serve protocol would severely limit the highest achievable efficiency because the system can serve the second command only after the first one has been completed.

FIG. 1 is a flow chart diagram showing flow of data transfer from a host to a physical device. Assuming that there are two functional units Flash Card 125 and DVDRW 120 attached to a host with logical DVDRW drive 100, logical Secure Digital (SD) Drive 105, and logical Memory Stick (MS) Drive 110. The host delivers packet commands to the physical devices consisting of function units 120 and 125 for data transfer. After optionally serializing for SATA interface with Serializer 115, data is transported to and from the functional units 120 and 125 using a single port on a channel over an IDE/AT bus cable, to DVDRW pick-up head (PUH) 130, MS card 135 or SD card 140.

FIG. 2 illustrates how wasteful the processing of a Flash Read and DVD Write command under this model can be due to the slow performance of Flash Card 125. Looking at the timing diagram of FIG. 2 regarding the bus usage, Flash Read step 200—comprising three stages of receiving command 205, buffering data 210, and transfer date 215—can take, for example, up to 10 ms. Of the 10 ms during which the bus is occupied with the Flash Read command, the actual data transfer time is only 1 ms. It is clear that the slower flash card read command takes most of the precious data channel without transferring any data with the host. Under this model, the much faster DVD Write 220 would have to wait for its turn to use the IDE bus after the bus has completed Flash Read 200, and data shortage may even cause problems on the quality of DVD recording.

Therefore, there is a need for an efficient method and system for running several vendor-specific ATAPI commands or other commands on multiple units using the same port.

SUMMARY

Among the advantages of the invention comprise one or more of the following: one advantage of the claimed invention is to provide an efficient method and system under which the precious bus resources can be freed up to perform actual data transfer when commands to multiple units and devices that connect to a single port of a predetermined interconnection means compete for resources on the data channel. According to the principle of this invention, the slower performing of the multiple devices and units will not unnecessarily tie up the data channel and thereby improve the overall system performance.

Another advantage of this invention is the flexibility in the "turning-on" and "turning-off" of the method and system of the invention according to other relevant considerations in the overall bus utilization or overall performance.

In general, in one aspect, the invention provides an electronic data storage system for efficient command performance. Among other things, the system has a host, and a plurality of storage devices electronically connected to the host through a single port of a data bus interface, wherein the host splits a command to one or more devices of the plurality of devices according to relative performance among the plurality of devices.

Implementation of the invention may include the following. The host splits a command requiring data transfer targeting the one device with a slowest data transfer speed; the host splits the command by dividing the command into two or more subcommands wherein each subcommand occupying the data bus for a shorter time period than a time period occupied by the command; the host splits the command by repeatedly sending the command until the one device returns a status message indicating the command is completed; the one device returns a status message indicating the repeated command is in process; the one device returns a status message indicating a time remaining for completing the repeated command.

The data bus interface may be an Integrated Drive Electronics (IDE) interface; the data bus interface may be a Serial AT Attachment (SATA) interface; the data bus interface comprises a universal serial bus ("USB") interface. The plurality of devices may comprise a flash card access device; the plurality of devices may comprise an optical storage device.

In another aspect, the invention provides a method of increasing command performance in an electronic data storage system. The method includes one or more of the following: connecting a plurality of units to a host through a single port of a data bus interface; splitting a command from the host to at least one unit of the plurality of units with slower data transfer rate by breaking the command into an initiating command and one or more polling command.

Implementation of the method may include the following. The plurality of units may comprise ATAPI units; the data bus interface may comprise a USB interface; the command may comprise an ATAPI Read command wherein the initiating command comprises a Read Trigger command and the one or more polling commands comprise Read Poll commands.

In another aspect, this invention provides a method of increasing command performance in an electronic data storage system. The method includes one or more of the following: connecting a plurality of devices to a host through a single port of a data bus interface; from a host, issuing a command for communication with a device of the plurality of devices having slower performance rate by sending the command repeatedly to the device.

Implementation of the method may include the following. The data bus interface may comprise an IDE interface. The device may reply individually to the repeatedly sent command from the host using a status of said command, wherein the status of the command is procedure started, expected time to finish, under progress, or completed. The command may be sent repeatedly at fixed time intervals; the command may be sent repeatedly according to a predetermined algorithm; the command may be sent repeatedly according to an indication by the device.

In yet another aspect, this invention provides an electronic system for efficient command performance. The system has a host and a plurality of peripheral units electronically connected to the host through a single port of a data bus interface, wherein the host splits a first command to at least one unit of the plurality of units into faster subcommands according to relative performance among the plurality of units.

Implementation of the invention may include the following. The subcommands may comprise a triggering command and one or more polling commands. The host may issue a second command to a second unit different from the at least one unit of the plurality of units receiving the first command between issuing the faster subcommands.

In an additional aspect, the invention provides an electronic system for efficient command performance. The system has a host; and a plurality of peripheral units electronically connected to the host through a single port of a data bus interface, wherein the host issues a command to a unit of the plurality of units having slower performance rate by sending the command repeatedly to the unit.

Implementation of the invention may include the following: The data bus interface may comprise an IDE interface. The host may require a reply from the unit indicating a status of the command following each sending of the command; the reply may be selected from the group consisting of procedure started, expected time to finish, under progress, and completed. The command may be sent repeatedly at fixed time intervals; the command may be sent according to a predetermined algorithm, Further features of the invention, its nature and various advantages will be more apparent from the accompanying drawings and the following detailed description of the invention.

BRIEF DESCRIPTION OF THE DRAWINGS

Like reference numbers and designations in the different figures indicate like elements.

DETAILED DESCRIPTION

In a system in which multiple peripheral devices and units connect to a host through a single port of a predetermined bus, the host may split a command being issued to a slow-performing device or unit to release interconnect data bus when no real data transfer is taking place between the host and the slow-performing unit. The following embodiments build on top of ATAPI commands' capability to indicate to the Host computer when Command Packet can be transferred, capability to interrupt the Host computer when data can be transferred, and capability to interrupt the Host computer upon conclusion of a command. While the present invention is described in the context of the use of IDE buses for interconnection, it should be appreciated that the invention is as applicable to a number of bus technologies, including but not limited to SATA and USB.

Figure 1:
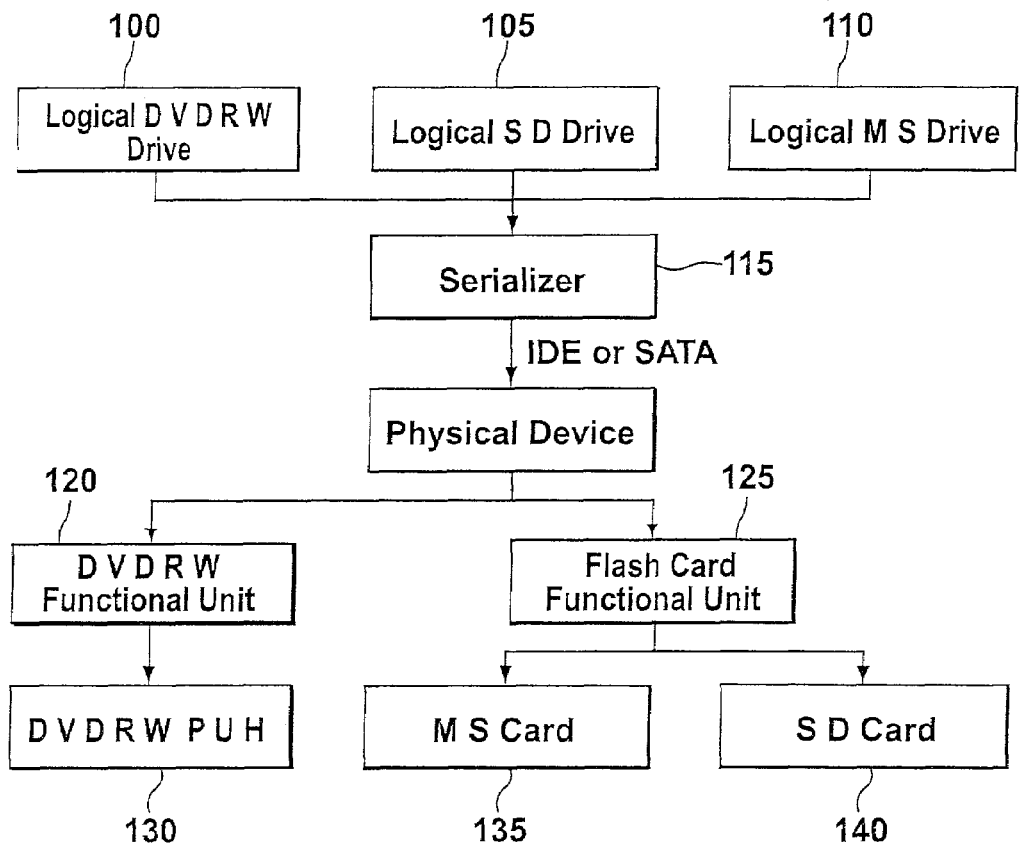
FIG. 1 is a flow chart showing the flow of data in an ATAPI command from the host to the physical devices.
Figure 2:
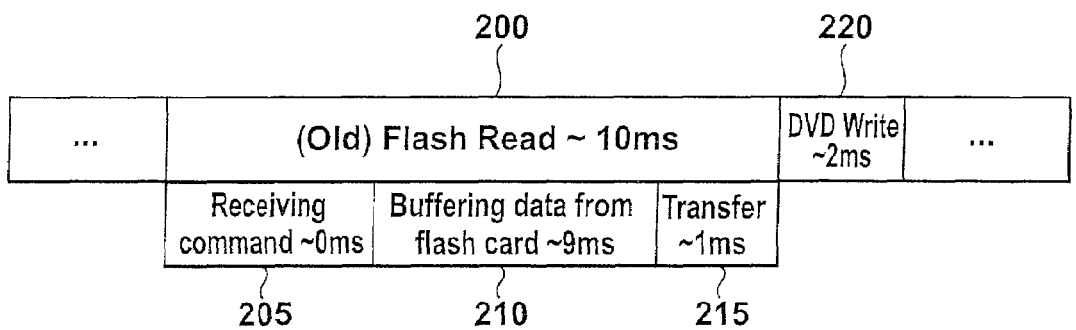
FIG. 2 is a schematic representation of timing requirements of executing two commands to two units connected to the host through the same interface.
Figure 3:
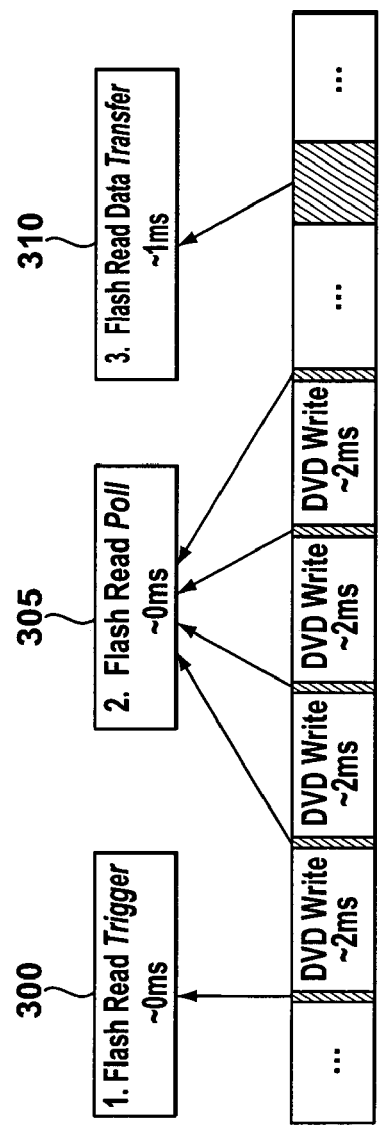
FIG. 3 is a schematic representation of timing requirements of executing commands to two units connected to the host through a single port of a predetermined bus according to the principles of the invention.

Referring to FIG. 3, both DVDRW 120 and Flash Card 125 are attached to the host through the same port. Because Flash Card 125 is slower in performance in comparison with DVDRW 120, the host may split the Flash Read command into three subcommands: Flash Read 300, Flash Read Poll 305, and Flash Read Data Transfer 310. Each of the subcommands is faster than the original command, and a command to DVDRW 120, such as command DVD Write, can be conducted in between the subcommands. As shown in FIG. 3, Flash Read Trigger 300 triggers the data read procedure of the flash card reader function. When this command is completed, which substantially occupies no time on the interconnect data bus, a DVD Write command to the next unit can follow immediately, which, for example, takes 2 ms of the interconnect data bus resources. A Flash Read Poll command 305 then follows, which, for example, takes 0 ms of the interconnect bus resources. Flash Read Poll command 305 can be issued from time to time to poll the status, and in between the Flash Read Poll commands 305, DVD Write or other commands may take up the interconnect bus resources. The process repeats until the host learns from the Flash Read Trigger command 300 or Flash Read Poll command 305 that desired data is ready, at which point the host issues a Flash Read Data Transfer command 310 to fetch the data, which takes up, for example, about 1 ms. Because the host does not have to wait for the slower, conventional Flash Read command 200 of FIG. 2 to finish before issuing other commands, the overall efficiency of the system implemented according to the principle of this invention is vastly improved. Comparing with the conventional Flash Read command 200, the time allotted to the DVDRW 120 is now 8 ms, instead of the 2 ms in the prior art, in the new Flash Read comprising Flash Read Trigger 300, Flash Read Poll 305, and Flash Read Data Transfer 310. The sample processing time slots are put in the specification for illustrative purposes only; it will be understood to those skilled in the art that the length of time to process the exemplary commands are for reference only throughout this specification.

The commands to be split according to the above principle will depend on how many independent functional units the system has, and the relative performance among them. The term "performance" herein may include data transfer rate, turn-around time, or the like. For example, DVDRW 120 with one tray and Flash Card unit 125 with two sockets share a single IDE or SATA port, so there are three logical units but only two independent functional units on the shared port. In this regard, there are no more than two commands executing at any given time. Since flash card readers are generally much slower than the DVDRW's, the commands for Flash Card unit 125 should be split. Splitting commands for the DVDRW 120 is a possibility, but it is not necessary unless it is helpful in improving overall system efficiency. Furthermore, the splitting of commands may cause some performance loss due to the extra command transactions, thus the host may choose to enable or disable this feature to achieve better overall performance and/or bus utilization. For example, it was observed that the splitting of commands would drag the Flash Card unit 125's performance considerably, and therefore the system driver enable the splitting of commands only when there are DVD read or write commands within the last 30 seconds. The reason behind the disabling of splitting of commands is that there is no real benefit to justify the extra command transactions unless IDE bus utilization is an issue because of DVD read or write command.

Figure 4:
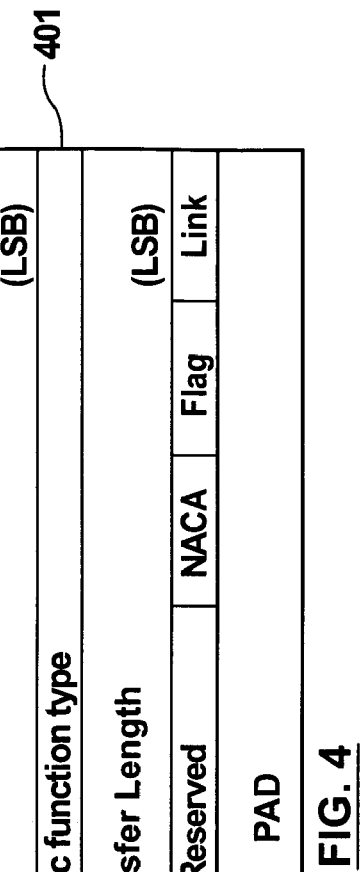
FIG. 4 is a command descriptor block illustrating a revised ATAPI command READ(10)

An ATAPI command can be split into at least into trigger and poll subcommands, and an optional data transfer subcommand. Each subcommand remains a legal ATAPI command and may return status or data fragments to indicate the progress. For example, an ATAPI command: READ(10) can be split into subcommands by modifying a typical READ (10) command. Referring to FIG. 4, byte 6, identified by numeral reference 401, of command READ(10) can be modified to indicate the specific function of a subcommand because the byte 6 is originally reserved in the typical READ(10) command. In one embodiment, the byte 6 with a value of '0' enables a READ subcommand to execute a trigger function; the byte 6 with a value of '1' enables a READ subcommand to execute a poll function; the byte 6 with a value of '2' enables a READ subcommand to execute a data transfer function. It should be appreciated that other reserved bits in a typical ATAPI command are contemplated to implement subcommands such that they occupy the IDE or SATA bus only when necessary. The example of FIG. 4 illustrates the current implementation; nonetheless, an ATAPI command may use any reserved bit(s) to achieve the goal.

Figure 5:
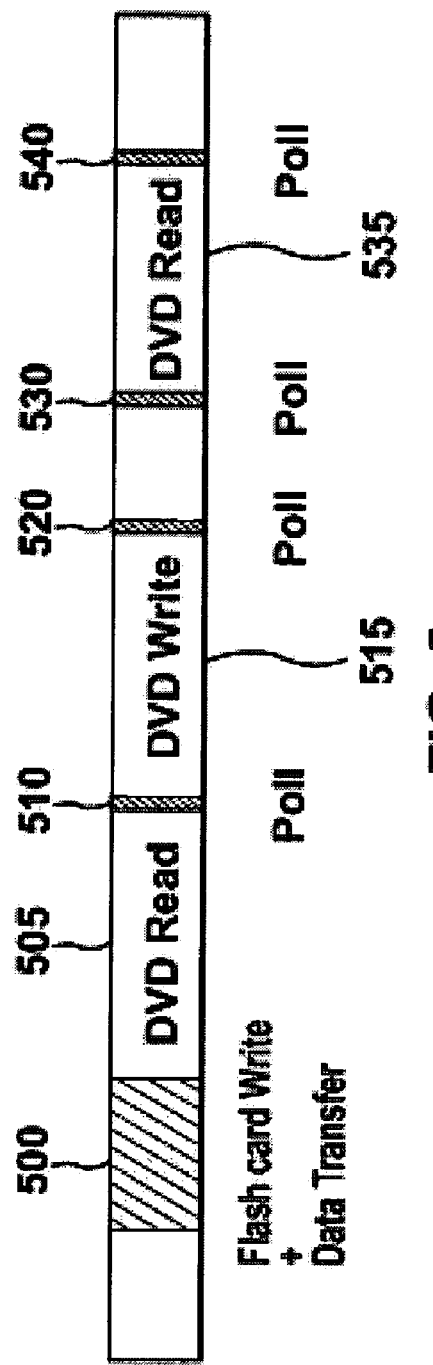
FIG. 5 is a schematic representation of timing sequence illustrating another embodiment of executing commands to two units connected to the host through a single port of a predetermined bus.

Another example is the Flash Card Write command 500 of FIG. 5. The host issues Flash Card Write command 500 carrying data for storage in the flash card unit. The flash card functional unit would start saving data in the background, if appropriate, and the host would issue a series of polling commands 510, 520, 530, and 540 to monitor the status. In between the polling commands 510, 520, 530, and 540 DVD Read command 505, DVD Write command 515 and DVD Read command 535 can be issued, as shown in FIG. 5. Again, the overall system performance is improved because two ATAPI commands are being executed by any available functional unit/physical device in or out of order depending on the availability of the interconnect bus resources. This principle can be applied to any number of commands that can be executed by any available number of functions units and/or physical devices, so long as the result of out-of-order execution does not cause any problems. depending on the availability of the interconnect bus resources. This principle can be applied to any number of commands that can be executed by any available number of functions units and/or physical devices, so long as the result of out-of-order execution does not cause any problems.

Alternatively, instead of splitting a command into faster, distinctive subcommands, the host may also repeatedly reissue the same command. For example, the host may repeatedly reissue Flash Read. After each Flash Read command, the unit may return a message indicating the read procedure has started successfully and may provide the expected time to finish through the task file registers or in the data phase; alternatively, the unit may return a message indicating the read procedure is still in progress and may provide the expected time to finish. The same command is repeatedly issued until the work it wants to do is finished. In this implementation, once such types of commands are issued, they will occupy the IDE or SATA bus only when necessary.

Figure 6:
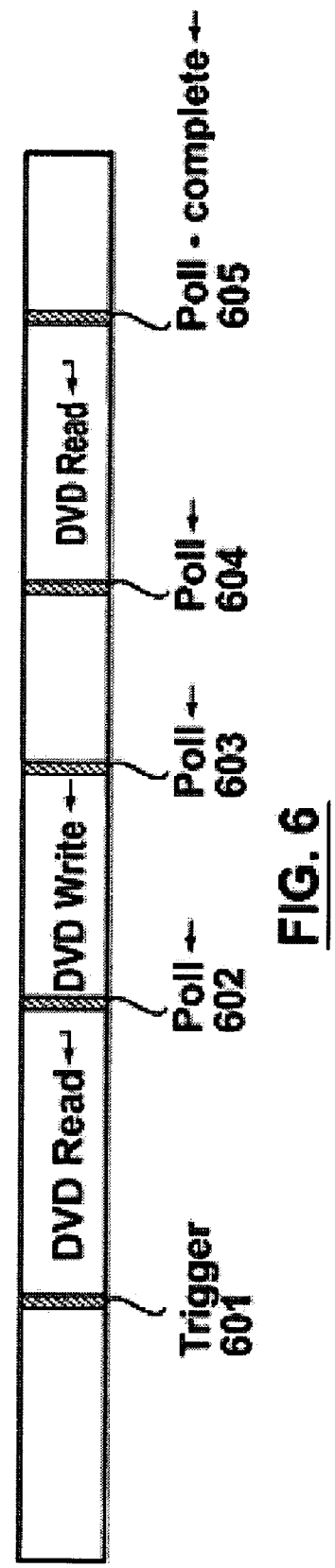
FIG. 6 is a diagram illustrating an embodiment of this invention in executing split subcommands without data transfer.

So far the invention has been illustrated with but should not be limited to read and write commands with data transfer. For example, an nit command for initialization of the Flash Card unit is illustrated in FIG. 6. According to the principles of this invention, this Init command can be split into a trigger subcommand 601, and one or more poll subcommands 602, 603, 604, and 605, but without a data transfer subcommand. The subcommands are denoted by shaded blocks.

The host may signal a peripheral unit whether a command should be split, repeated, or whether the unit should only return after the command has been finished. The firmware of the unit may also decide how to execute the command, provided the host allows the unit's firmware such discretion. The decisions are generally determined by, for example, the estimated turn-around time of a command; the long command should be split or repeated to free up interconnect bus resources. Furthermore, the decisions may depend on whether there is any request issued by other units that is being queued.

Figure 7:
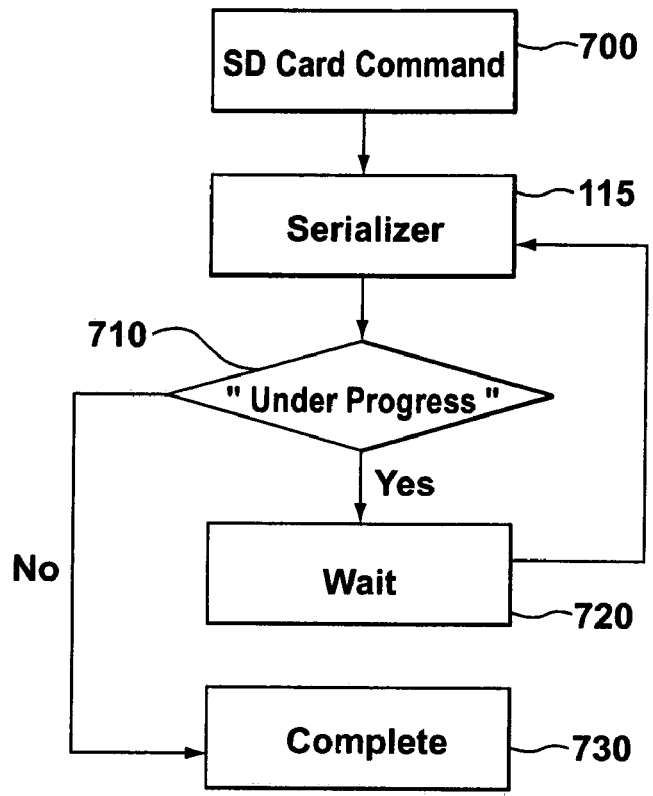
FIG. 7 is a flow diagram illustrating the processing steps of a repeated Read command by a host according to the principles of this invention.

FIG. 7 illustrates the polling command of a flash card reader 125 comprising SD card 140. The host initiates a SD card command at step 700, with an optional serializing step 115. As with polling commands, the flash card reader may return a message "under progress" at step 710. If yes, the host waits at step 720, and the next command can be executed by a different functional unit. The host goes back to the serializing step 115 for the next polling command. If no message indicating "under progress" is returned by the flash card reader, the command is then complete at step 730.

Figure 8:
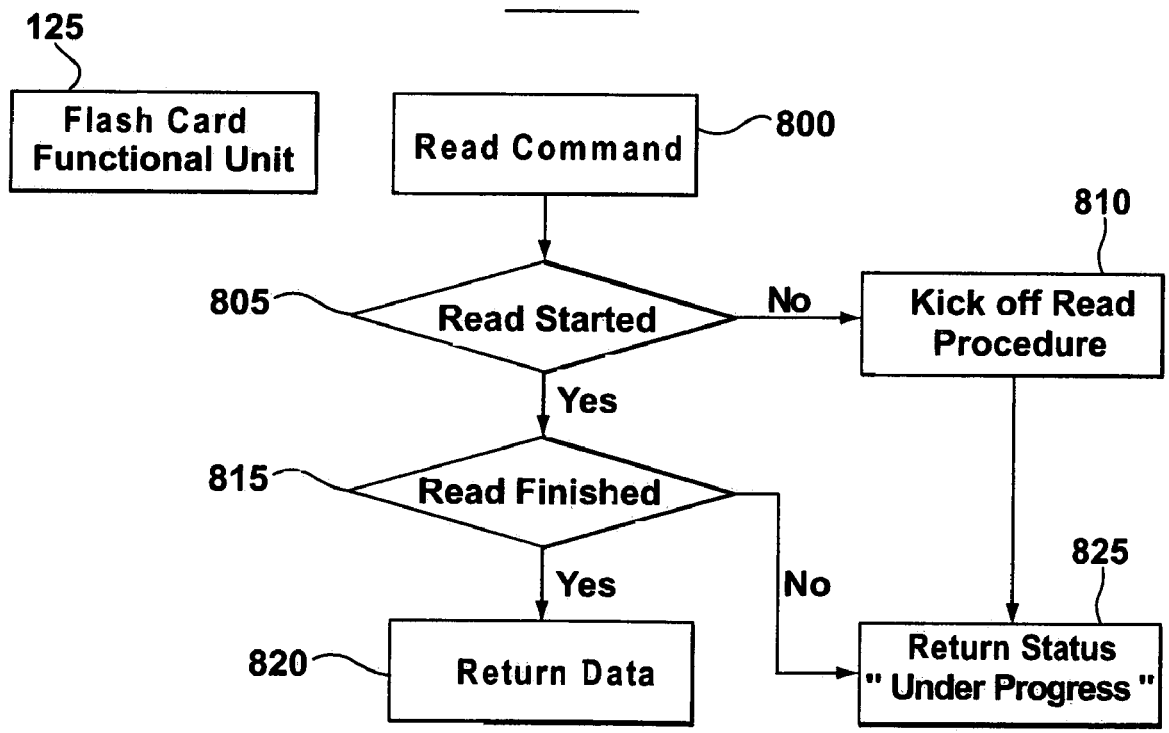
FIG. 8 is a flow diagram illustrating exemplary processing steps of a repeated Read command by the firmware of a sample flash card unit.

FIG. 8 illustrates process steps of the firmware inside a flash card function unit 125 when the read command is not split into distinctive commands but is repeated. After receiving the read command at step 800, the firmware checks to see if the read process has started at step 805. If so, it checks to see if the read command has already finished at step 815. If so, data is returned to the host at step 820. If not, a message "under progress" is returned at step 825. If read has not started, the read procedure is started at step 810, and a message "under progress" is returned at step 825.

Although the description of the present invention has focused on the IDE bus and the SATA interface, the present invention is not limited to these interconnection types. The interconnection means can be another interconnection means supporting a plurality attached units by a single port of the predetermined interconnection means. For example, a Universal Serial Bus ("USB") allows multiple units to connect thereto. Access to the multiple units is typically made by commands transmitted over the USB to the units, and the multiple units can comprise, for instance, a web camera sharing an USB with a mass storage unit, such as a ZIP drive. Depending on the relative performance of the web camera and the ZIP drive, a write command to the web camera can be split or repeated according to the teaching of the invention to free up the bus resources required by the ZIP drive operations, and thus increase the overall system efficiency.

The foregoing description of the invention has been presented for purposes of illustration and description. It is not intended to be exhaustive or to limit the invention to the precise embodiments disclosed. Those skilled in the art will readily observe that numerous modifications and alterations of the device may be made without departing from the scope, spirit or teachings of the invention. The invention is defined by the following claims and their equivalents:

What is claimed is:

1. An electronic data storage system for efficient command performance, comprising:
   a host; and
   a plurality of storage devices, electronically connected to the host through a single port of a data bus interface;
   wherein the host splits a command to one or more devices of the plurality of devices according to relative performance among the plurality of devices by dividing the command into two or more subcommands each subcommand occupying the data bus for a shorter time period than a time period occupied by the command.

2. The electronic data storage system of claim 1, wherein the host splits the command requiring data transfer targeting the one device with a slowest data transfer speed.

3. The electronic data storage system of claim 1, wherein the data bus interface comprises an Integrated Drive Electronics (IDE) interface.

4. The electronic data storage system of claim 1, wherein the data bus interface comprises a Serial AT Attachment (SATA) interface.

5. The electronic data storage system of claim 1, wherein the data bus interface comprises a universal serial bus ("USB ") interface.

6. The electronic data storage system of claim 1, wherein the plurality of devices comprise a flash card access device.

7. The electronic data storage system of claim 1, wherein the plurality of devices comprise an optical storage device.

8. An electronic data storage system for efficient command performance, comprising:
   a host; and
   a plurality of storage devices, electronically connected to the host through a single port of a data bus interface;
   wherein the host splits a command to one or more devices of the plurality of storage devices according to relative performance among the plurality of devices by repeatedly sending the command;
   wherein the one device returns a status message indicating the repeated command is in process, and the host repeatedly sends the command until the one device returns a status message indicating the command is completed.

9. The electronic data storage system of claim 8, wherein the host splits the command requiring data transfer targeting the one device with a slowest data transfer speed.

10. The electronic data storage system of claim 8, wherein the data bus interface comprises an Integrated Drive Electronics (IDE) interface.

11. The electronic data storage system of claim 8, wherein the data bus interface comprises a Serial AT Attachment (SATA) interface.

12. The electronic data storage system of claim 8, wherein the data bus interface comprises a universal serial bus ("USB") interface.

13. The electronic data storage system of claim 8, wherein the plurality of devices comprise a flash card access device.

14. The electronic data storage system of claim 8, wherein the plurality of devices comprise an optical storage device.

15. An electronic data storage system for efficient command performance, comprising:
   a host; and
   a plurality of storage devices, electronically connected to the host through a single port of a data bus interface;
   wherein the host splits a command to one or more devices of the plurality of devices according to relative performance among the plurality of devices by repeatedly sending a command;
   wherein the one device returns a status message indicating a time remaining for completing the repeated command, and the host repeatedly sends the command until the one device returns a status message indicating the command is completed.

16. The electronic data storage system of claim 15, wherein the host splits the command requiring data transfer targeting the one device with a slowest data transfer speed.

* * * * *